United States Patent
Jackson et al.

(10) Patent No.: US 9,467,308 B2
(45) Date of Patent: Oct. 11, 2016

(54) METHODS AND APPARATUS TO CONTROL SYNCHRONIZATION IN VOICE OVER INTERNET PROTOCOL NETWORKS AFTER CATASTROPHES

(75) Inventors: James Jackson, Austin, TX (US); Chaoxin Charles Qiu, Austin, TX (US); Mehrad Yasrebi, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1408 days.

(21) Appl. No.: 12/184,516

(22) Filed: Aug. 1, 2008

(65) Prior Publication Data

US 2010/0027529 A1    Feb. 4, 2010

(51) Int. Cl.
| | |
|---|---|
| H04L 29/06 | (2006.01) |
| H04M 7/00 | (2006.01) |
| H04M 3/36 | (2006.01) |
| H04Q 11/04 | (2006.01) |
| H04L 12/64 | (2006.01) |

(52) U.S. Cl.
CPC ................................. *H04L 12/6418* (2013.01)

(58) Field of Classification Search
CPC ... H04W 60/04; H04W 60/02; H04W 76/00; G06F 2201/81; G06F 2201/86
See application file for complete search history.

(56) References Cited

U.S. PATENT DOCUMENTS

| | | | | |
|---|---|---|---|---|
| 5,507,035 | A | * | 4/1996 | Bantz et al. ................. 455/133 |
| 5,956,393 | A | * | 9/1999 | Tessler .................... H04M 3/36 379/137 |
| 6,151,491 | A | * | 11/2000 | Farris et al. ................ 455/412.2 |
| 6,356,755 | B1 | * | 3/2002 | Valentine et al. ......... 455/435.1 |
| 6,356,767 | B2 | | 3/2002 | Froula |
| 6,542,491 | B1 | | 4/2003 | Tari et al. |
| 6,760,594 | B1 | | 7/2004 | Murasawa et al. |
| 6,968,050 | B1 | | 11/2005 | Pershan et al. |
| 7,099,671 | B2 | | 8/2006 | Liang |
| 7,158,803 | B1 | | 1/2007 | Elliott |
| 7,161,468 | B2 | * | 1/2007 | Hwang et al. ............... 340/5.82 |

(Continued)

OTHER PUBLICATIONS

NET-SAFE, downloaded from http://www.acmepacket.com/html/page.asp?PageID=%7BFB2657BA-EE7A-46C1-BEA8-, on May 16, 2008 , 4 pages.

(Continued)

*Primary Examiner* — Parth Patel
*Assistant Examiner* — Jason Harley
(74) *Attorney, Agent, or Firm* — Hanley, Flight & Zimmerman, LLC

(57) ABSTRACT

Example methods and apparatus to control synchronization in voice over Internet protocol (VoIP) networks after catastrophes are disclosed. An example border element comprises a network interface to receive a VoIP network registration request message from a VoIP endpoint, a catastrophe detector to determine whether a catastrophe has been detected, a backoff time module to compute a backoff time using a priority assigned to the VoIP endpoint and an expected number of VoIP network registration request messages, a recovery module to determine whether the VoIP endpoint is currently registered with the VoIP network, and to send a response message having a header representing the backoff time to the VoIP endpoint when the catastrophe has been detected and the VoIP endpoint is not currently registered with a VoIP network, and a signaling processor to process the VoIP network registration request message when the VoIP endpoint is currently registered with the VoIP network.

19 Claims, 3 Drawing Sheets

(56) References Cited

U.S. PATENT DOCUMENTS

| | | | |
|---|---|---|---|
| 7,212,506 B2 | 5/2007 | Varney et al. | |
| 2002/0024943 A1* | 2/2002 | Karaul | H04L 29/06 370/338 |
| 2002/0101860 A1* | 8/2002 | Thornton et al. | 370/352 |
| 2002/0176545 A1 | 11/2002 | Schweitzer | |
| 2003/0053480 A1* | 3/2003 | Jang et al. | 370/445 |
| 2003/0119506 A1* | 6/2003 | Singhai et al. | 455/435 |
| 2003/0129988 A1 | 7/2003 | Lee et al. | |
| 2003/0131132 A1 | 7/2003 | Cheng et al. | |
| 2004/0095954 A1 | 5/2004 | Varney et al. | |
| 2004/0165529 A1 | 8/2004 | Lee | |
| 2005/0163126 A1 | 7/2005 | Bugenhagen et al. | |
| 2005/0186974 A1 | 8/2005 | Cai | |
| 2005/0286499 A1 | 12/2005 | Kobayashi et al. | |
| 2006/0030290 A1* | 2/2006 | Rudolf | H04W 76/007 455/404.1 |
| 2006/0056382 A1* | 3/2006 | Yamada et al. | 370/349 |
| 2006/0077962 A1 | 4/2006 | Wu et al. | |
| 2006/0077983 A1 | 4/2006 | Miyajima et al. | |
| 2006/0083222 A1 | 4/2006 | Miyajima et al. | |
| 2006/0109833 A1* | 5/2006 | Uh et al. | 370/346 |
| 2006/0116128 A1 | 6/2006 | Benveniste | |
| 2006/0153076 A1 | 7/2006 | Bradd | |
| 2006/0245573 A1 | 11/2006 | Sheth et al. | |
| 2006/0274766 A1* | 12/2006 | Kwon | 370/401 |
| 2007/0019623 A1 | 1/2007 | Alt et al. | |
| 2007/0032255 A1* | 2/2007 | Koo et al. | 455/512 |
| 2007/0061397 A1 | 3/2007 | Gregorat et al. | |
| 2007/0070989 A1 | 3/2007 | Savoor et al. | |
| 2007/0165821 A1* | 7/2007 | Altberg | H04L 29/06027 379/210.02 |
| 2007/0171823 A1 | 7/2007 | Hunt et al. | |
| 2007/0286352 A1* | 12/2007 | Yasrebi | H04L 29/06027 379/37 |
| 2008/0056234 A1 | 3/2008 | Sprague | |
| 2008/0117809 A1 | 5/2008 | Wang et al. | |
| 2008/0267064 A1 | 10/2008 | Broadhurst et al. | |
| 2008/0285543 A1 | 11/2008 | Qiu et al. | |
| 2010/0011118 A1 | 1/2010 | Chang et al. | |
| 2010/0027532 A1* | 2/2010 | Sparks et al. | 370/352 |

OTHER PUBLICATIONS

NET-NET OS-SBC, downloaded from http://www.acmepacket.com/html/page.asp?PageID=%7b06E4AEBC-24E2-46CC-BA95-, on May 16, 2008, 4 pages.

United States Patent and Trademark Office, "Final Office Action," issued in connection with U.S. Appl. No. 11/749,415, mailed Jan. 26, 2015 (16 pages).

United States Patent and Trademark Office, "Final Office Action," issued in connection with U.S. Appl. No. 11/749,415, mailed Jul. 3, 2012 (18 pages).

United States Patent and Trademark Office, "Non-Final Office Action," issued in connection with U.S. Appl. No. 11/749,415, mailed Oct. 13, 2011 (16 pages).

United States Patent and Trademark Office, "Non-Final Office Action," issued in connection with U.S. Appl. No. 11/749,415, mailed Jun. 13, 2014 (19 pages).

United States Patent and Trademark Office, "Non-Final Office Action," issued in connection with U.S. Appl. No. 11/749,415, Jan. 12, 2016, 41 pages.

United States Patent and Trademark Office, "Notice of Allowance," issued in connection with U.S. Appl. No. 11/749,415, mailed Jul. 7, 2016, 17 pages.

* cited by examiner

METHODS AND APPARATUS TO CONTROL SYNCHRONIZATION IN VOICE OVER INTERNET PROTOCOL NETWORKS AFTER CATASTROPHES

FIELD OF THE DISCLOSURE

This disclosure relates generally to voice over Internet protocol (VoIP) networks and, more particularly, to methods and apparatus to control synchronization in VoIP networks after catastrophes.

BACKGROUND

During a catastrophe (such as a power outage, a natural disaster, and/or a man-made disaster) a large percentage (such as 100%) of VoIP devices in a geographic area (such as a neighborhood, a city, a county, etc.) may lose their ability to communicate with their associated VoIP network. When the catastrophe is over (such as when power is restored, when wireless connectivity is restored, and/or when Internet connectivity is restored), the VoIP network may be inundated with a large number of substantially simultaneous VoIP network registration requests. Such an inundatation of registration requests may quickly overwhelm the signaling and/or protocol processing capabilities of the VoIP network.

DETAILED DESCRIPTION

Methods and apparatus to control synchronization in voice over Internet protocol (VoIP) networks after catastrophes are disclosed. A disclosed example border element for a VoIP network includes a network interface to receive a VoIP network registration request message from a VoIP endpoint, a catastrophe detector to determine whether a catastrophe has been detected, a backoff time module to compute a backoff time using a priority assigned to the VoIP endpoint and an expected number of VoIP network registration request messages, a recovery module to determine whether the VoIP endpoint is currently registered with the VoIP network, and to send a response message having a header representing the backoff time to the VoIP endpoint when the catastrophe has been detected and the VoIP endpoint is not currently registered with a VoIP network, and a signaling processor to process the VoIP network registration request message when the VoIP endpoint is currently registered with the VoIP network.

A disclosed example method includes receiving an Internet protocol multimedia subsystem (IMS) registration request message from an IMS endpoint, determining whether a catastrophe has been detected, computing a backoff time using a priority assigned to the IMS endpoint, and sending an IMS response message having a header representing the backoff time to the IMS endpoint when the catastrophe has been detected.

In the interest of brevity and clarity, throughout the following disclosure references will be made to an example IMS-based VoIP network 110 of FIG. 1. Moreover, the following disclosure will be made using session initiation protocol (SIP) messages and/or SIP-based message exchanges. However, the methods and apparatus described herein to control synchronization in IMS-based VoIP networks after catastrophes are applicable to other IMS and/or VoIP communication systems and/or networks (e.g., networks based on soft switches), and/or other types of protocols, messages, and/or message exchanges.

Figure 1:
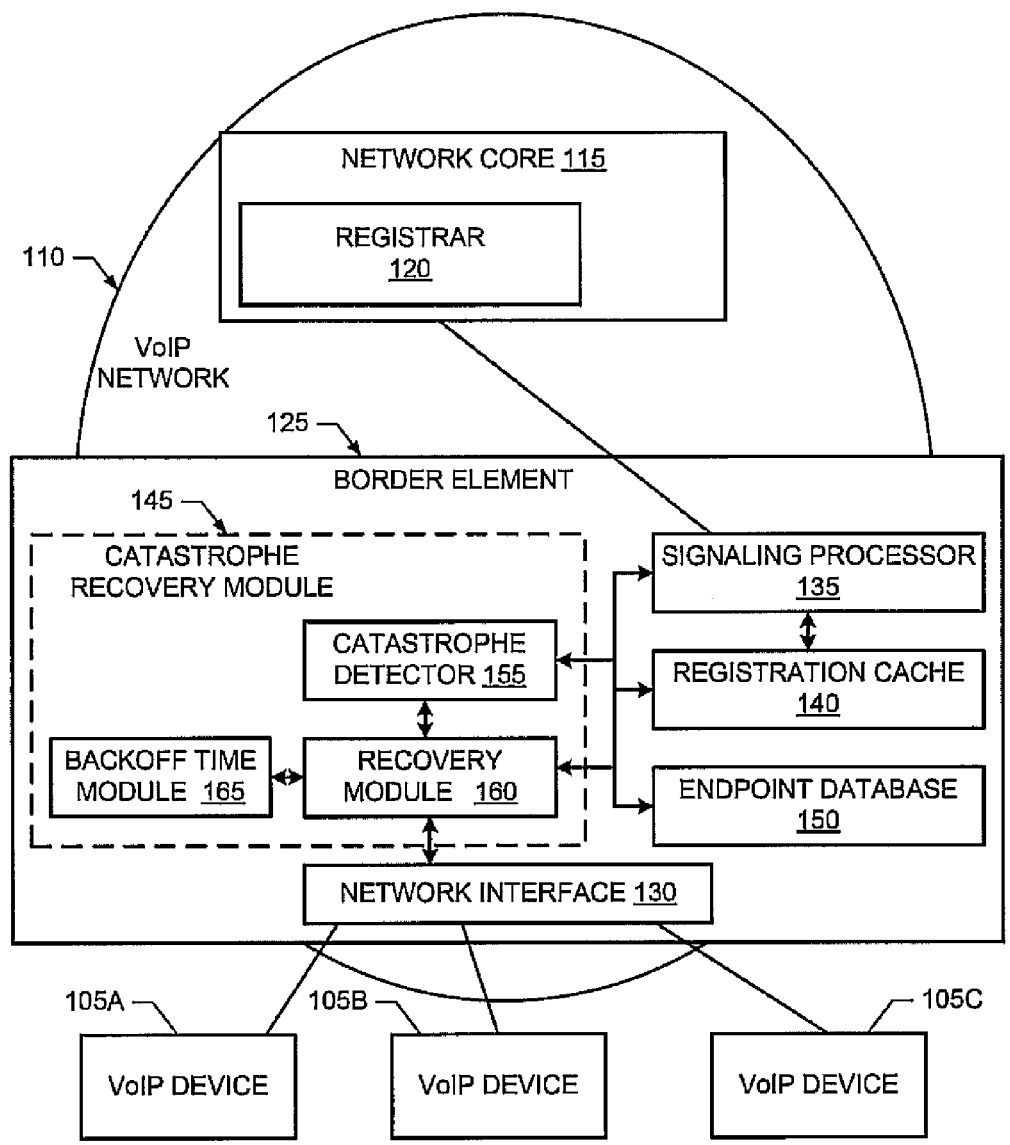
FIG. 1 is a schematic illustration of an example communication system constructed in accordance with the teachings of this disclosure.

FIG. 1 is a schematic illustration of an example communication system including any number and/or type(s) of VoIP user devices, three of which are designated at reference numerals 105A, 105B and 105C. Example VoIP user devices 105A-C include, but are not limited to, IMS (e.g., VoIP) phones, VoIP residential gateways, VoIP enabled personal computers (PC), VoIP endpoints, wireless VoIP devices (e.g., a wireless-fidelity (WiFi) Internet protocol (IP) phone), VoIP adapters (e.g., an analog telephone adapter (ATA)), VoIP enabled personal digital assistants (PDA), and/or VoIP kiosks. The example VoIP devices 105A-C of FIG. 1 may be implemented and/or be found at any number and/or type(s) of locations. Further, the VoIP devices 105A-C may be fixed location devices, substantially fixed location devices and/or mobile devices. Moreover, the VoIP devices 105A-C may have equipment communicatively and/or electrically coupled to them. For example, a VoIP ATA may be coupled to a telephone, and/or a VoIP residential gateway may be coupled to a PC and/or set-top box.

To provide communication services to a set of subscribers, the example communication system of FIG. 1 includes the VoIP network 110. In general, the example VoIP network 110 of FIG. 1 provides and/or enables VoIP, IMS and/or other type(s) of communication services (e.g., telephone services, Internet services, data services, messaging services, instant messaging services, electronic mail (email) services, chat services, video services, audio services, gaming services, voicemail, facsimile services, etc.) to the example VoIP device 105A-C and/or to other VoIP devices.

To implement the communication services, the example VoIP network 110 of FIG. 1 includes any type of IMS and/or VoIP network core 115. In the illustrated example VoIP network 110 of FIG. 1, before each VoIP device (e.g., the example VoIP device 105A-C) can access the services provided by the VoIP network 110 and/or the network core 115, each VoIP device must register with the VoIP network 110. To register VoIP devices, the example network core 115 of FIG. 1 includes one or more SIP registrars, one of which is designated at reference numeral 120 in FIG. 1. The example registrar 120 of FIG. 1 processes VoIP network registration request messages to register VoIP devices to the VoIP network 110. An example VoIP network registration request message comprises a SIP REGISTER message.

Each VoIP device of the example VoIP communication system of FIG. 1 (e.g., the example VoIP devices 105A-C) is assigned a priority within the VoIP network 110 that reflects its importance relative to other VoIP devices and/or VoIP endpoints of the VoIP network 110. For example, VoIP devices associated with hospitals, fire stations, police stations, etc. may be assigned higher priorities than VoIP devices associated with standard consumers. Likewise, some enterprises (i.e., businesses) may have service contracts stipulating that their associated VoIP devices are assigned a higher priority than VoIP devices associated with standard consumers, although potentially still a lower priority than entities such as hospitals, fire stations, police stations, etc. A VoIP device's priority is determined by the example SIP registrar 120 when the VoIP device registers with the VoIP network 110. Any number of priorities may be defined and/or used by the example VoIP network 110. As described below, the priorities assigned to VoIP devices will be used to synchronize, coordinate and/or prioritize VoIP network registration request messages following a catastrophe, such as a fire, a power outage, a natural disaster and/or a man-made disaster.

While one SIP registrar 120 is illustrated in FIG. 1, a network core (e.g., the example network core 115) and/or, more generally, a VoIP network (e.g., the example VoIP network 110) may include any number and/or type(s) of registrars. Moreover, while not shown in FIG. 1 for ease of illustration and discussion, the example network core 115 may include any number and/or type(s) of call session control function (CSCF) server(s), feature server(s), media gateway(s), breakout gateway control function (BGCF) server(s), home subscriber server(s) (HSS), tElephone NUMber mapping (ENUM) server(s), domain name service (DNS) server(s), application server(s), media gateway control function (MGCF) server(s), softswitch(es), IP router(s), IP switch(es), etc.

To provide entry and/or exits points to the example VoIP network 110, the example VoIP network 110 of FIG. 1 includes any number of border elements (e.g., access and/or peered), one of which is designated at reference numeral 125. The example border element 125 of FIG. 1 implements a boundary point between a) one or more private networks used to implement the example VoIP network 110, and b) one or more public networks (e.g., the Internet), one or more private networks (e.g., home and/or corporate local area networks) and/or one or more access networks by which the example VoIP devices 105A-C may be communicatively coupled to the network core 115.

To communicate with the example VoIP devices 105A-C, the example border element 125 of FIG. 1 includes any number and/or type(s) of network interfaces, one of which is designated at reference numeral 130. The example network interface 130 of FIG. 3 operates in accordance with any of the IEEE 802.3x (a.k.a. Ethernet) family of standards.

To process SIP protocol and/or signaling messages, the example border element 125 of FIG. 1 includes any number and/or type(s) of signaling processors, one of which is designated at reference numeral 135. The example signaling processor 135 of FIG. 1 handles and/or processes incoming and/or outgoing SIP messages, and/or performs and/or carries out any other border element functionality. For example, the signaling processor 135 can perform SIP re-registrations for the VoIP devices 105A-C. The example signaling processor 135 implements a state engine and/or maintains state information for SIP transactions, dialogs, and communication sessions. An example signaling processor 135 is a general purpose processor (single and/or multi-core).

To store VoIP device registration information, the example border element 125 of FIG. 1 includes a registration cache 140. The example registration cache 140 of FIG. 1 stores VoIP device registration information for each of a plurality of VoIP devices (e.g., the example VoIP devices 105A-C). Example registration information that may be stored for a VoIP device includes, but is not limited to, whether the VoIP device is currently registered, when the current registration expires, which serving-CSCF server is associated with the VoIP device, etc. The example registration cache 140 may be implemented using any number and/or type(s) of data structures, and may be stored in any number and/or type(s) of memory(-ies) and/or memory device(s).

To synchronize, control and/or prioritize VoIP network registration requests following a catastrophe, the example border element 125 of FIG. 1 includes a catastrophe recovery module 145. When a catastrophe is detected and/or has occurred, the example catastrophe recovery module 145 of FIG. 1 controls the subsequent flood of VoIP network registration requests received from the VoIP devices 105A-C such that the registrar 120 and/or, more generally, the network core 115 do not become overloaded. Were the registrar 120 and/or the network core 115 to become overloaded by the flood of registration requests, recovery from the catastrophe may be further delayed. The example catastrophe recovery module 145 synchronizes the registrations of the VoIP devices 105A-C with the VoIP network 110 based on their assigned priorities such that the highest priority VoIP devices 105A-C are registered first. Thus, communication services are restored first to high-priority entities such as hospitals, police departments, fire departments, emergency response personnel, etc. In some examples, the example signaling processor 135 of FIG. 1 implements the example catastrophe recovery module 145.

To store the assignments of priorities to VoIP devices, the example border element 125 of FIG. 1 includes an endpoint database 150. For each VoIP device associated with the border element 125, the example endpoint database 150 of FIG. 1 stores a value representative of its assigned priority. Additionally or alternatively, a VoIP device's priority can be determined using any number and/or type(s) of method(s), logic and/or process(es). For example, a VoIP device's priority may be determined based on the border element 125 and/or interface 130 via which the VoIP device 105A-C accesses the VoIP network 110, and/or a header and/or a field of a SIP registration request message sent by the VoIP device 105A-C (e.g., a domain name associated with a SIP uniform resource identifier (URI)). An example data structure that may be used to implement the example endpoint database 150 is described below in connection with FIG. 2. The example endpoint database 150 may be stored in any number and/or type(s) of memory(-ies) and/or memory device(s).

When a VoIP device (e.g., any of the example VoIP devices 105A-C) registers with the VoIP network 110, the example SIP registrar 120 of FIG. 1 responds with a registration response message (e.g., a SIP 200 OK message) containing a value and/or field that represents the priority assigned to the VoIP device. In the illustrated example of FIG. 1, a VoIP device's priority is configured in network core 115 in connection with subscription information associated the VoIP device 105A-C. When the example signaling processor 135 of FIG. 1 receives the registration response message from the SIP registrar 120, the signaling processor 135: (a) modifies the registration response message to remove the priority assigned to the VoIP device, (b) forwards the modified registration response message to the VoIP device via the network interface 130, (c) updates the registration cache 140, and (d) stores the VoIP device's assigned priority in the endpoint database 150 for future use by the example catastrophe recovery module 145.

When a VoIP device fails to or is unable to re-register with the VoIP network 110 within a re-registration window (e.g., 180 seconds), the signaling processor 135 flushes the registration information associated with the VoIP device from the registration cache 140 and, in some examples, records the failure in the endpoint database 150. Likewise, if a VoIP device re-registers with a different IP address, the example signaling processor 135 of FIG. 1 updates the registration cache 140 and the endpoint database 150.

While the example registration cache 140 and the example endpoint database 150 are shown as separate data structures in FIG. 1, the registration cache 140 and the endpoint database 150 could be implemented as a single data structure.

To detect catastrophes, the example catastrophe recovery module 145 of FIG. 1 includes a catastrophe detector 155. The example catastrophe detector 155 of FIG. 1 uses the number of VoIP devices that fail to re-register with the VoIP network 110 to detect catastrophes. When a catastrophe occurs, a large number and/or percentage of the VoIP devices 105A-C will fail to and/or be unable to re-register with the VoIP network 110, thus, becoming de-registered. The example catastrophe detector 155 maintains a running count of the number of de-registrations that occur during a period of time (e.g., during the last 10 seconds, during the last 60 seconds, etc.). If the number of de-registrations during the period of time exceeds a threshold, then the example catastrophe detector 155 determines that a catastrophe has, probably has, or is occurring.

To control, synchronize and/or prioritize VoIP network registration requests, the example catastrophe recover module 145 of FIG. 1 includes recovery module 160. When a VoIP network registration request message is received from a VoIP device (e.g., any of the example VoIP devices 105A-C) via the network interface 130, the example recovery module 160 of FIG. 1 consults the registration cache 140 to determine whether the VoIP device is currently registered. If the VoIP device is currently registered or has previously been delayed in registering with the VoIP network 110, the signaling processor 135 processes the registration request in accordance with any past, present or future signaling protocol.

If the VoIP device is not currently registered, the example recovery module 160 determines whether the catastrophe detector 155 has detected a catastrophe. If a catastrophe has not been detected, the signaling processor 135 processes the registration request in accordance with any past, present or future signaling protocol. If a catastrophe has been detected, the recovery module 160 delays the registration request based on the priority assigned to the VoIP device. The example recovery module 160 of FIG. 1 delays the registration request by responding to the registration request message with a response message that specifies how long the VoIP device is to wait before re-attempting to register with the VoIP network 110. An example failure response message comprises a SIP 5xx message (where xx is any suitable two-digit number) having a conventional Retry-After header that specifies the minimum amount of time that must elapse before the VoIP device sends another registration request message to the VoIP network 110. As is traditional, when the VoIP device receives a protocol response message having a Retry-After header, the VoIP device starts a timer based on the value specified in the Retry-After header and, when the timer expires, can, if still required or desired, resend or reinitiate the protocol message exchange. By rejecting the registration request via the SIP 5xx message, the example signaling processor 135 does not need to process the registration request nor maintain a SIP dialog state for the VoIP device, which further reduces the load on the signaling processor 135 and the network core 115 during the recovery from the catastrophe.

If a call is initiated via a VoIP device (e.g., any of the example VoIP devices 105A-C) while the VoIP device is not registered due to a catastrophe, the example VoIP device sends a registration request message having a field and/or header indicating that the registration request represents a request to be immediately registered in response to a call initiation request. In response to a registration request message having such an indication, the example recovery module 160 of FIG. 1 automatically increases the priority of the VoIP device such that the VoIP device can become registered with the VoIP network 115 on a priority basis to allow the requested communication session (e.g., telephone call) to be established. In some examples, the VoIP device is registered at the earliest time as determined by its assigned priority. In other examples, the VoIP device is registered at the earliest time possible regardless of its assigned priority. Additionally or alternatively, a VoIP device needing to initiate a communication session while unregistered adds a SIP header to the SIP INVITE message that is sends to indicate that the VoIP device is to be given priority for becoming registered with the VoIP network 110.

To determine how long a VoIP device's registration request is to be delayed, the example catastrophe recovery module 145 includes a backoff time module 165. Based on the VoIP device's assigned priority, the example backoff time module 165 of FIG. 1 computes or selects a random number between X and X+Y, where the value of X is determined based on the priority assigned to the VoIP device. The value of Y is determined based on the current load of the VoIP network 110, the expected or estimated number of VoIP devices that need to be registered and/or the maximum number of registrations per second that can be processed by the VoIP network. The maximum supported rate of registrations may be determined by the capability(-ies) of any or all of the border element 125, the signaling processor 135, the registrar 120 and/or the network core 115.

Consider an example having one or more emergency enterprises (e.g., a hospital enterprise A and another emergency responder enterprise B), where all such emergency enterprises have been assigned a priority of 1 (i.e., the highest priority), and one or more department store enterprises (e.g., stores C, D, and E) with assigned priorities of 2. The example backoff time module 165 of FIG. 1 assigns a value of X=1 to the priority 1 enterprises. If it is expected that 100,000 VoIP devices associated collectively with the priority 1 enterprises need to be registered and at most 100 registrations per second can be supported, the backoff time module 165 assigns a value of Y=1000 to the priority 1 enterprises. Thus, VoIP devices associated with the highest priority enterprises are backed off a random amount of time between 1 and 1001.

Because all of the priority 1 enterprises' VoIP devices need to be registered before VoIP devices associated with the department store enterprises, the backoff time module 165 assigns a value of X=1002 or higher to the department store enterprises C, D and E. If the department store enterprises collectively have 10,000 devices that need to be registered, then the backoff time module 165 assigns a value of Y=100 to the department store enterprises. Thus, VoIP devices associated with the department store enterprises are backed off a random amount of time between 1002 and 1102. An X value of higher than 1002 may be chosen to allow for larger separations of randomized re-registration requests and/or for load management purposes.

While an example border element 125 has been illustrated in FIG. 1, one or more of the interfaces, data structures, elements, processes and/or devices illustrated in FIG. 1 may be combined, divided, re-arranged, omitted, eliminated and/or implemented in any other way. Further, the example network interface 130, the example signaling processor 135, the example registration cache 140, the example catastrophe recovery module 145, the example endpoint database 150, the example catastrophe detector 155, the example recovery module 160, the example backoff time module 165 and/or, more generally, the example border element 125 may be implemented by hardware, software, firmware and/or any combination of hardware, software and/or firmware. Thus, for example, any of the example network interface 130, the example signaling processor 135, the example registration cache 140, the example catastrophe recovery module 145, the example endpoint database 150, the example catastrophe detector 155, the example recovery module 160, the example backoff time module 165 and/or, more generally, the example border element 125 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example network interface 130, the example signaling processor 135, the example registration cache 140, the example catastrophe recovery module 145, the example endpoint database 150, the example catastrophe detector 155, the example recovery module 160, the example backoff time module 165 and/or, more generally, the example border element 125 are hereby expressly defined to include a tangible medium such as a memory, a digital versatile disc (DVD), a compact disc (CD), etc. storing the firmware and/or software. Further still, a border element may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
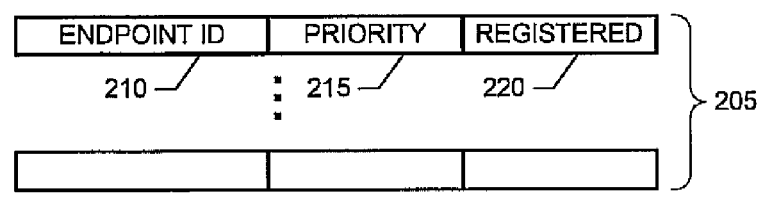
FIG. 2 illustrates an example data structure that may be used to implement an endpoint database for the example communication system of FIG. 1.

FIG. 2 illustrates an example data structure that may be used to implement the example endpoint database 150 of FIG. 1. The example data structure of FIG. 2 contains a plurality of records 205 for respective ones of a plurality of VoIP devices. To identify a VoIP device (e.g., one of the example VoIP devices 105A-C), each of the example records 205 of FIG. 2 includes an endpoint identity field 210. The example endpoint identity field 210 of FIG. 2 includes an alphanumeric string (e.g., of the form JohnDoe12@aaavoipprovider.com) that represents and/or identifies an Address of Record (sometimes called a Public User Identity) assigned to a VoIP device.

To store a priority, each of the example records 205 of FIG. 2 includes a priority field 215. The example priority field 215 of FIG. 2 contains a number (e.g., 1=high, 2, 3, . . . ) that represents the priority assigned to the VoIP device identified by the endpoint identity field 210.

To indicate whether a VoIP device is currently registered, each of the example records 205 of FIG. 2 includes a registered field 220. The example registered field 220 of FIG. 2 contains a binary value or flag that indicates whether the VoIP device identified by the endpoint identity field 210 is currently registered. For example, a value of 1 indicates that the VoIP device is registered and a value of 0 indicates that the VoIP device is not currently registered.

While an example data structure is illustrated in FIG. 2, the example data structure may be implemented using any number and/or type(s) of other and/or additional fields and/or data. For example, each of the records 205 of FIG. 2 could also include an address field containing the current IP address assigned to a VoIP device. Further, the fields and/or data illustrated in FIG. 2 may be combined, divided, re-arranged, eliminated and/or implemented in any way. For example, the example data structure of FIG. 2 could be implemented in conjunction with the example registration cache 140 of FIG. 1. Moreover, the example data structure may include fields and/or data in addition to, or instead of, those illustrated in FIG. 2, and/or may include more than one of any or all of the illustrated fields and/or data.

Figure 3:
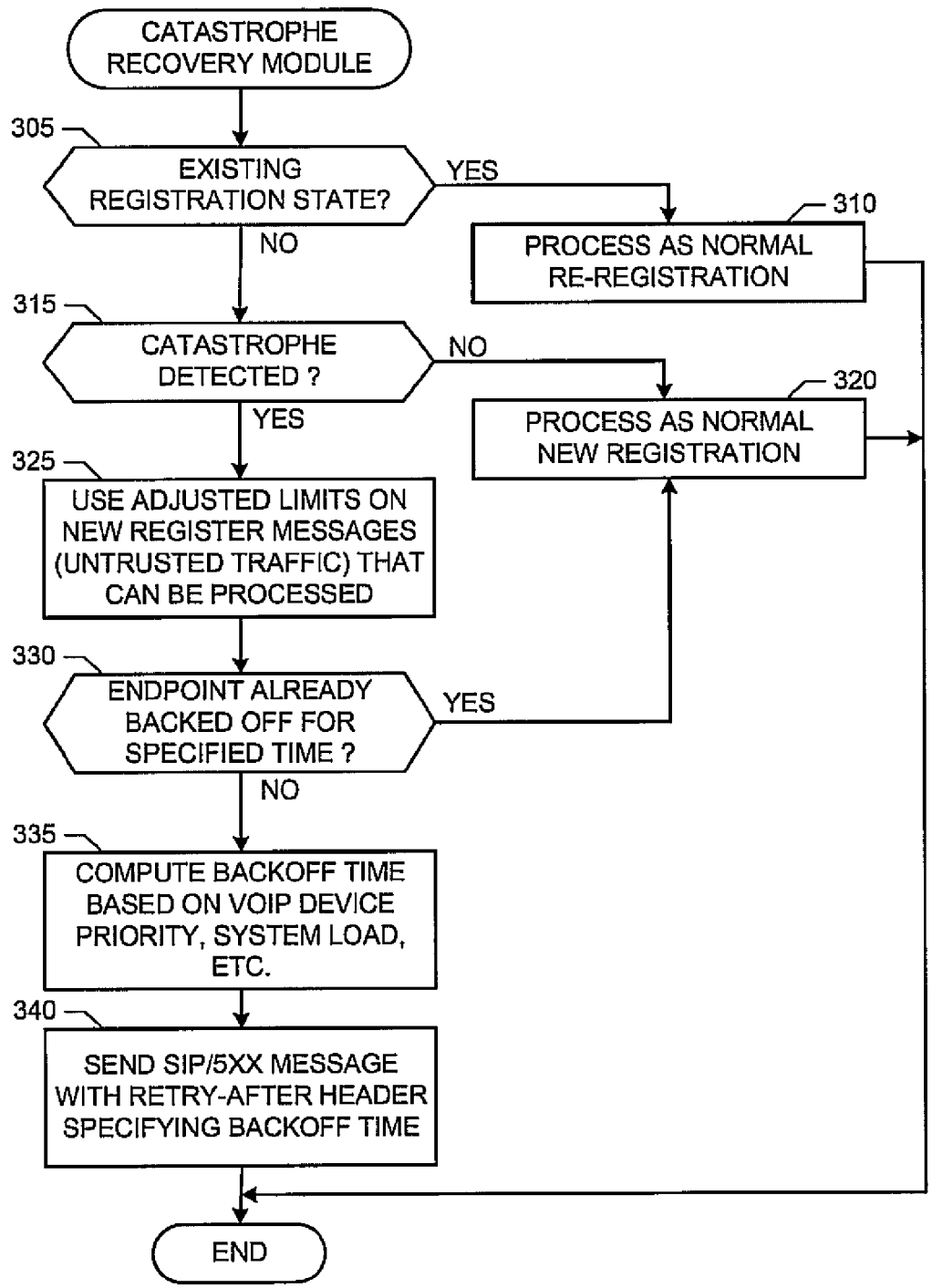
FIG. 3 is a flowchart representative of example machine accessible instructions that may be executed by, for example, a processor to implement a catastrophe recovery module for the example communication system of FIG. 1.

FIG. 3 illustrates example machine accessible instructions that may be executed to implement the example catastrophe recovery module 145 of FIG. 1. The example machine accessible instructions of FIG. 3 may be carried out by a processor, a controller and/or any other suitable processing device. For example, the example machine accessible instructions of FIG. 3 may be embodied in coded instructions stored on a tangible machine and/or computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, a magnetic storage disk, a magnetic storage device, and/or any other tangible medium, which can be accessed, read and/or executed by a processor, a general purpose or special purpose computer or other machine with a processor (e.g., the example processor platform P100 discussed below in connection with FIG. 4). Alternatively, some or all of the example machine accessible instructions of FIG. 3 may be implemented using any combination(s) of ASIC(s), PLD(s), FPLD(s), discrete logic, hardware, firmware, etc. Also, some or all of the example machine accessible instructions of FIG. 3 may be implemented manually or as any combination of any of the foregoing techniques, for example, any combination of firmware, software, discrete logic and/or hardware. Further, many other methods of implementing the example operations of FIG. 3 may be employed. For example, the order of execution of the blocks may be changed, and/or one or more of the blocks described may be changed, eliminated, sub-divided, or combined. Additionally, any or all of the example machine accessible instructions of FIG. 3 may be carried out sequentially and/or carried out in parallel by, for example, separate processing threads, processors, devices, discrete logic, circuits, etc.

The example machine accessible instructions of FIG. 3 begin when a VoIP network registration request message (e.g., SIP REGISTER message) is received from a VoIP device (e.g., any of the example VoIP devices 105A-C) at the example catastrophe recovery module 145 of FIG. 1. The example recovery module 160 queries the endpoint database 150 and/or the registration cache 140 to determine whether the VoIP device is currently registered (block 305). If the VoIP device is current registered (block 305), the example signaling processor 135 processes the registration request message in accordance with any past, present or future protocol and/or standard (block 310). Control then exits from the example machine accessible instructions of FIG. 3.

Returning to block 305, if the VoIP device is not currently registered (block 305), the recovery module 160 queries the example catastrophe detector 155 of FIG. 1 to determine if a (probable) catastrophe has been detected (block 315). If a catastrophe has not been detected (block 315), the example signaling processor 135 processes the registration request message in accordance with any past, present or future protocol and/or standard (block 320). Control then exits from the example machine accessible instructions of FIG. 3.

Returning to block 315, if a (probable) catastrophe has been detected by the example catastrophe detector 155 (block 315), the example recovery module 160 of FIG. 1 adjusts the limits on the number of untrusted traffic that can be processed by the signaling processor 135, if they have not already been adjusted (block 325). Untrusted traffic is traffic associated with un-registered VoIP devices and the amount of untrusted traffic is generally restricted in VoIP networks to ensure that registered and/or trusted VoIP devices are given priority. However, since a (probable) catastrophe has been detected, the recovery module 160 increases the limit on untrusted traffic to allow de-registered VoIP devices to become re-registered as quickly as possible.

If the VoIP device has already been backed off once before (block 330), the example signaling processor 135 processes the registration request message in accordance with any past, present or future protocol and/or standard (block 320). Control then exits from the example machine accessible instructions of FIG. 3.

Returning to block 330, if the VoIP device has not already been backed off once (block 330), the example backoff time module 165 of FIG. 1 computes a value representative of the amount of time the VoIP device is to be backed off before it sends another registration request message (block 335). The recovery module 160 sends a response message specifying the backoff time computed by the backoff time module 165 (block 340). An example response message comprises a SIP 5xx message having a Retry-After header that specifies the backoff time. Control then exits from the example machine accessible instructions of FIG. 3.

Figure 4:
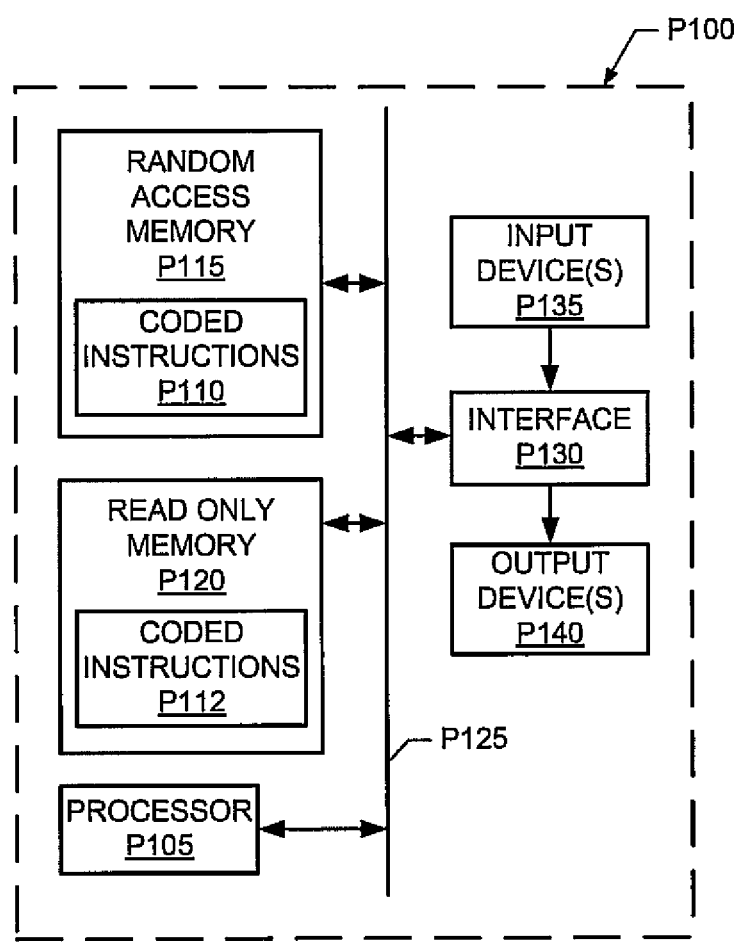
FIG. 4 is a schematic illustration of an example processor platform that may be used and/or programmed to carry out the example machine accessible instructions of FIG. 3 and/or to implement any or all of the example methods and apparatus described herein.

FIG. 4 is a schematic diagram of an example processor platform P100 that may be used and/or programmed to implement any or all of the example signaling processor 135, the example catastrophe recovery module 145 and/or, more generally, the example border element 125 of FIG. 1. For example, the processor platform P100 can be implemented by one or more general purpose processors, processor cores, microcontrollers, etc.

The processor platform P100 of the example of FIG. 4 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine accessible instructions of FIG. 3 to implement the example catastrophe recovery module 145 described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device(s), and ROM may be implemented by flash memory, EPROM, EEPROM, a CD, a DVD and/or any other desired type of memory device(s). Access to the memory P115 and the memory P120 may be controlled by a memory controller (not shown). The example memory P115 may be used to implement the example registration cache 140 and/or the example endpoint database 150 of FIG. 1.

The processor platform P100 also includes an interface circuit P130. The interface circuit P130 may be implemented by any type of interface standard, such as an external memory interface, serial port, general purpose input/output, etc. One or more input devices P135 and one or more output devices P140 are connected to the interface circuit P130. The input devices P135 and/or output devices P140 may be used to, for example, implement the example network interface 130 of FIG. 1.

The order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of this disclosure are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A border element for a voice over Internet protocol network, the border element comprising:
   a catastrophe detector to determine whether a catastrophe has been detected in the voice over Internet protocol network, the catastrophe identified when a threshold number of re-registration attempts via a session initiation protocol and corresponding re-registration failure events occur in the voice over Internet protocol network within a time interval;
   a backoff time module to compute a backoff time using a registration rate capability value of a border element;
   a recovery module to, in response to receiving a voice over Internet protocol network registration request message from a voice over Internet protocol endpoint, determine whether the voice over Internet protocol endpoint is currently registered with the voice over Internet protocol network, and to send a response message having a header representing the backoff time to the voice over Interent protocol endpoint when the voice over Internet protocol endpoint is not currently registered with the voice over Internet protocol network; and
   a signaling processor to process the voice over Internet protocol network registration request message when the voice over Internet protocol endpoint is currently registered with the voice over Internet protocol network.

2. The border element as defined in claim 1, wherein the voice over Internet protocol network registration request message includes a session initiation protocol REGISTER message, the response message includes a session initiation protocol 5xx message, and the header includes a session initiation protocol Retry-After header.

3. The border element as defined in claim 1, wherein the backoff time module is to compute the backoff time using at least one of the number of voice over Internet protocol endpoint re-registration failure events, a number of voice over Internet protocol network registration request messages that can be processed, a number of voice over Internet protocol endpoints still registered, a processor utilization, or a memory utilization.

4. The border element as defined in claim 1, wherein the backoff time module is to compute the backoff time by randomly selecting a first value between a second value and a third value, the first value and the second value determined based on the priority assigned to the voice over Internet protocol endpoint.

5. The border element as defined in claim 1, wherein the recovery module is to forward the voice over Internet protocol network registration request message to the signaling processor when the voice over Internet protocol endpoint was previously responded to with the response message having the header representing the backoff time.

6. A method comprising:
   detecting at a border element a catastrophe in an Internet protocol multimedia subsystem when a threshold number of re-registration attempts and corresponding re-registration failure events occur via a session initiation protocol in an Internet protocol multimedia subsystem within a time interval;
   computing, with the border element, a backoff time using a registration rate capability value of the border element; and
   in response to receiving an Internet protocol multimedia subsystem registration request message from an Internet protocol multimedia subsystem endpoint via the border element, sending an Internet protocol multimedia subsystem response message having a header representing the backoff time to the Internet protocol multimedia subsystem endpoint when the Internet protocol multimedia subsystem endpoint is not currently registered with the Internet protocol multimedia subsystem-based network.

7. The method as defined in claim 6, further including determining whether the Internet protocol multimedia subsystem endpoint is currently registered with the Internet protocol multimedia subsystem-based network.

8. The method as defined in claim 6, further including:
   determining whether the Internet protocol multimedia subsystem endpoint is currently registered with an Internet protocol multimedia subsystem-based network; and
   processing the Internet protocol multimedia subsystem registration request message when the Internet protocol multimedia subsystem endpoint is currently registered with the Internet protocol multimedia subsystem-based network.

9. The method as defined in claim 6, further including computing the backoff time using at least one of the number of Internet protocol multimedia subsystem endpoint re-registration failure events, a number of Internet protocol multimedia subsystem registration request messages that can be processed, a number of Internet protocol multimedia subsystem endpoints still registered, a processor utilization, or a memory utilization.

10. The method as defined in claim 6, further including computing the backoff time based on a priority associated with the Internet protocol multimedia subsystem endpoint.

11. The method as defined in claim 6, further including computing the backoff time by randomly selecting a first value between a second value and a third value.

12. The method as defined in claim 6, further including forwarding the Internet protocol multimedia subsystem registration request message to an Internet protocol multimedia subsystem core when the Internet protocol multimedia subsystem endpoint was previously responded to with the Internet protocol multimedia subsystem response message having the header representing the backoff time.

13. A tangible machine readable storage device comprising instructions which, when executed, cause a border element in an Internet protocol multimedia network to perform operations comprising:
   detecting a catastrophe in an Internet protocol multimedia subsystem by identifying whether a threshold number of re-registration attempts via a session initiation protocol and corresponding re-registration failure events have occurred in the Internet protocol multimedia subsystem within a time interval;
   computing a backoff time using a registration rate capability value of the border element; and
   in response to receiving an Internet protocol multimedia subsystem registration request message from an Internet protocol multimedia subsystem endpoint, sending an Internet protocol multimedia subsystem response message having a header representing the backoff time to the Internet protocol multimedia subsystem endpoint when the Internet protocol multimedia subsystem endpoint is not currently registered with the Internet protocol multimedia subsystem-based network.

14. The tangible machine readable storage device as defined in claim 13, wherein the operations further include determining whether the Internet protocol multimedia subsystem endpoint is currently registered with the Internet protocol multimedia subsystem-based network.

15. The tangible machine readable storage device as defined in claim 13, wherein the operations further include:
determining whether the Internet protocol multimedia subsystem endpoint is currently registered with an Internet protocol multimedia subsystem-based network; and
processing the Internet protocol multimedia subsystem registration request message when the Internet protocol multimedia subsystem endpoint is currently registered with the Internet protocol multimedia subsystem-based network.

16. The tangible machine readable storage device as defined in claim 13, wherein the operations further include computing the backoff time using at least one of the number of Internet protocol multimedia subsystem endpoint re-registration failure events, a number of registration request messages that can be processed, a number of Internet protocol multimedia subsystem endpoints still registered, a processor utilization, or a memory utilization.

17. The tangible machine readable storage device as defined in claim 13, wherein the operations further include computing the backoff time based on a priority associated with the Internet protocol multimedia subsystem endpoint.

18. The tangible machine readable storage device as defined in claim 13, wherein the operations further include computing the backoff time by randomly selecting a first value between a second value and a third value.

19. The tangible machine readable storage device as defined in claim 13, wherein the operations further include forwarding the Internet protocol multimedia subsystem registration request message to an Internet protocol multimedia subsystem core when the Internet protocol multimedia subsystem endpoint was previously responded to with the Internet protocol multimedia subsystem response message having the header representing the backoff time.

* * * * *